US010428660B2

(12) United States Patent
Hill et al.

(10) Patent No.: US 10,428,660 B2
(45) Date of Patent: Oct. 1, 2019

(54) HYBRID AIRFOIL COOLING

(71) Applicant: United Technologies Corporation, Farmington, CT (US)

(72) Inventors: James D Hill, W. Abington Township, CT (US); Ram Ranjan, West Hartford, CT (US); Glenn Levasseur, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 404 days.

(21) Appl. No.: 15/420,882

(22) Filed: Jan. 31, 2017

(65) Prior Publication Data

US 2018/0216473 A1  Aug. 2, 2018

(51) Int. Cl.
  *F01D 5/18* (2006.01)
  *F01D 9/04* (2006.01)
  *F01D 25/12* (2006.01)

(52) U.S. Cl.
  CPC ............. *F01D 5/187* (2013.01); *F01D 5/181* (2013.01); *F01D 9/041* (2013.01); *F01D 25/12* (2013.01); *F05D 2220/32* (2013.01); *F05D 2240/121* (2013.01); *F05D 2240/122* (2013.01); *F05D 2240/24* (2013.01); *F05D 2240/304* (2013.01); *F05D 2260/201* (2013.01); *F05D 2260/202* (2013.01); *F05D 2260/208* (2013.01); *Y02T 50/676* (2013.01)

(58) Field of Classification Search
  None
  See application file for complete search history.

(56) References Cited

U.S. PATENT DOCUMENTS

| 2,744,723 | A | * | 5/1956 | Roush | F01D 5/181 |
| | | | | | 415/114 |
| 2,782,000 | A | * | 2/1957 | Ledinegg | F01D 5/085 |
| | | | | | 415/178 |
| 3,164,367 | A | * | 1/1965 | Lynch | F01D 5/187 |
| | | | | | 415/114 |
| 3,334,685 | A | * | 8/1967 | Burggraf | F01D 5/181 |
| | | | | | 165/104.25 |
| 3,376,918 | A | * | 4/1968 | Foure | F01D 5/181 |
| | | | | | 165/47 |

(Continued)

FOREIGN PATENT DOCUMENTS

| EP | 1884625 | 2/2008 |
| EP | 1908922 | 4/2008 |
| GB | 2057113 | 3/1981 |

OTHER PUBLICATIONS

European Patent Office, European Search Report dated Jun. 7, 2018 in Application No. 18150125.5-1006.

*Primary Examiner* — Carlos A Rivera
*Assistant Examiner* — Theodore C Ribadeneyra
(74) *Attorney, Agent, or Firm* — Snell & Wilmer, L.L.P.

(57) ABSTRACT

An airfoil may comprise an airfoil body having a leading edge and a trailing edge. A heat pipe may be disposed within the airfoil. The heat pipe may include a vaporization section and a condensation section. The vaporization section may be disposed within the airfoil body and may be configured to remove heat from the trailing edge. The second cooling apparatus may be disposed within the airfoil body and may be configured to remove heat from the leading edge.

16 Claims, 9 Drawing Sheets

(56) References Cited

U.S. PATENT DOCUMENTS

| | | | | |
|---|---|---|---|---|
| 3,623,825 | A * | 11/1971 | Schneider | F01D 5/18 416/231 R |
| 3,738,771 | A * | 6/1973 | Delarbre | F01D 5/181 165/104.25 |
| 4,136,516 | A * | 1/1979 | Corsmeier | F01D 5/185 415/114 |
| 4,190,398 | A * | 2/1980 | Corsmeier | F01D 5/18 415/114 |
| 4,835,958 | A * | 6/1989 | Rice | F01D 5/185 415/114 |
| 5,151,012 | A * | 9/1992 | Hough | F01D 5/181 416/95 |
| 5,201,634 | A * | 4/1993 | Hough | F01D 5/181 416/95 |
| 5,253,976 | A * | 10/1993 | Cunha | F01D 5/182 415/114 |
| 5,320,483 | A * | 6/1994 | Cunha | F01D 5/187 415/114 |
| 5,498,126 | A * | 3/1996 | Pighetti | F01D 5/187 415/115 |
| 5,536,143 | A * | 7/1996 | Jacala | F01D 5/187 416/96 R |
| 5,634,766 | A * | 6/1997 | Cunha | F01D 5/187 415/115 |
| 5,782,076 | A * | 7/1998 | Huber | F02C 7/08 415/115 |
| 5,975,841 | A | 11/1999 | Lindemuth | |
| 6,036,436 | A * | 3/2000 | Fukuno | F01D 5/187 415/115 |
| 6,450,759 | B1 * | 9/2002 | Miller | F01D 5/187 415/115 |
| 6,468,031 | B1 * | 10/2002 | Yu | F01D 5/189 415/114 |
| 6,742,984 | B1 * | 6/2004 | Itzel | F01D 5/189 29/889.722 |
| 6,843,637 | B1 * | 1/2005 | Pothier | F01D 9/041 415/114 |
| 6,988,367 | B2 * | 1/2006 | Thompson, Jr. | F01D 5/085 60/744 |
| 7,137,782 | B2 * | 11/2006 | Eastman | F01D 5/187 416/96 R |
| 7,547,191 | B2 * | 6/2009 | Liang | F01D 5/187 416/97 R |
| 8,056,345 | B2 * | 11/2011 | Norris | F02C 7/14 60/736 |
| 8,622,704 | B2 * | 1/2014 | Stiehler | F01D 5/225 416/146 R |
| 8,628,298 | B1 * | 1/2014 | Liang | F01D 5/187 416/96 R |
| 9,353,687 | B1 * | 5/2016 | Brostmeyer | F02C 7/16 |
| 10,012,093 | B2 * | 7/2018 | Mugglestone | F01D 5/188 |
| 2002/0037217 | A1 * | 3/2002 | Itzel | F01D 5/18 415/115 |
| 2005/0050877 | A1 * | 3/2005 | Venkataramani | F02C 7/047 60/39.093 |
| 2006/0120855 | A1 * | 6/2006 | Djeridane | F01D 5/082 415/115 |
| 2007/0022732 | A1 * | 2/2007 | Holloway | F02C 7/14 60/39.08 |
| 2010/0014964 | A1 * | 1/2010 | Smith | C23C 30/00 415/200 |
| 2013/0071251 | A1 * | 3/2013 | Relancio | F01D 5/16 416/223 R |
| 2013/0195610 | A1 * | 8/2013 | Rose | F01D 5/145 415/1 |
| 2013/0224034 | A1 * | 8/2013 | Sakamoto | F01D 5/141 416/225 |
| 2015/0041590 | A1 * | 2/2015 | Kirtley | F01D 5/187 244/123.1 |
| 2015/0298791 | A1 * | 10/2015 | Nordin | B64C 3/28 244/45 R |
| 2016/0146022 | A1 * | 5/2016 | Twelves | B33Y 80/00 244/123.1 |
| 2017/0152752 | A1 * | 6/2017 | Myers | F01D 5/147 |

\* cited by examiner

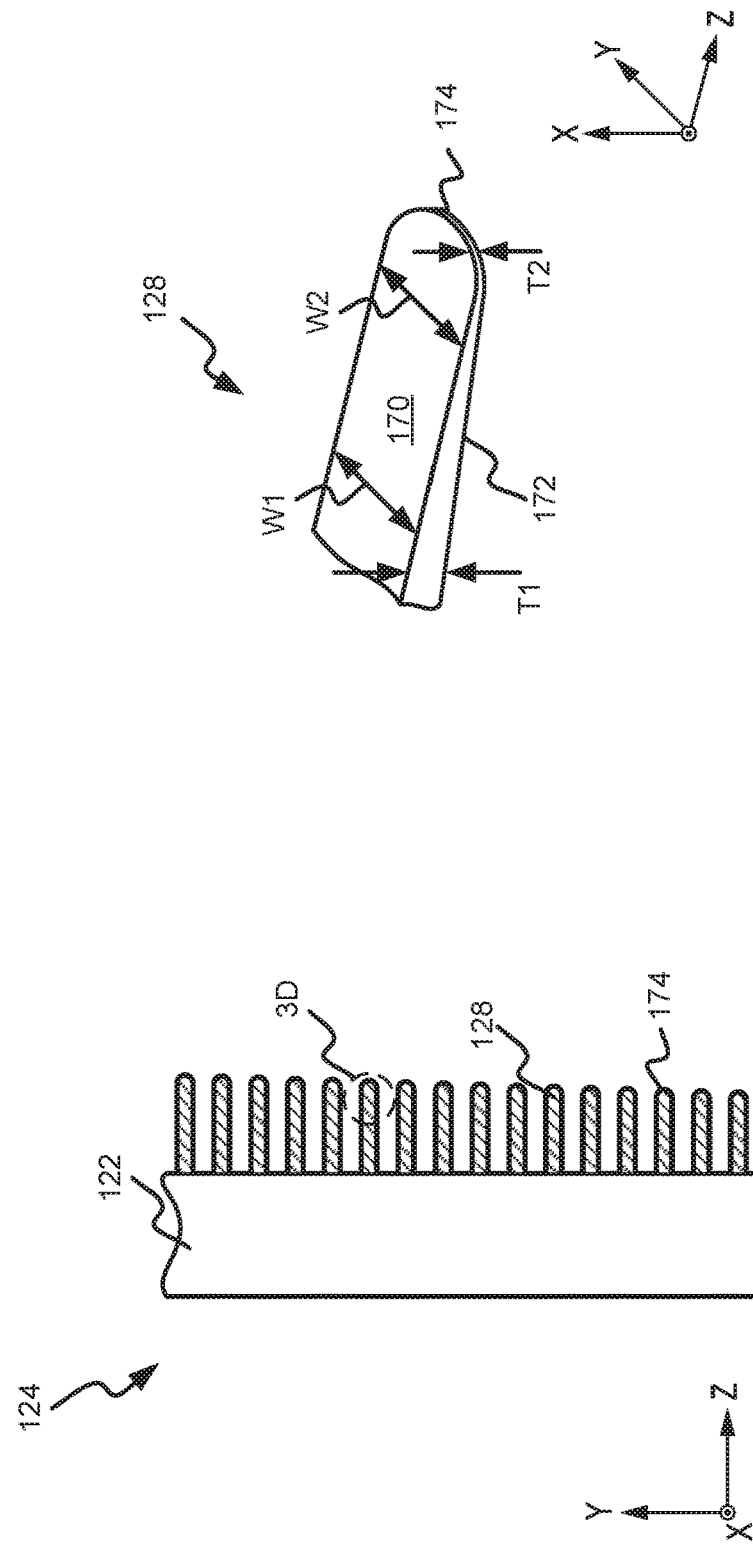

HYBRID AIRFOIL COOLING

FIELD

The present disclosure relates to cooling structures for gas turbine engines, and, more specifically, to airfoil cooling structures.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Cooling air may be extracted from the compressor section and used to cool the gas path components. Cooled components may include, for example, rotating blades and stator vanes in the turbine section. One mechanism used to cool turbine airfoils includes utilizing internal cooling circuits and/or a baffle.

SUMMARY

An airfoil is provided. The airfoil may comprise an airfoil body having a leading edge and a trailing edge. A heat pipe may be disposed within the airfoil. The heat pipe may include a vaporization section and a condensation section. The vaporization section may be disposed within the airfoil body and may be configured to remove heat from the trailing edge. The second cooling apparatus may be disposed within the airfoil body and may be configured to remove heat from the leading edge.

In various embodiments, the vaporization section may comprise a plurality of tabs extending toward the trailing edge. The plurality of tabs may be in contact with an inner surface of the airfoil body. The plurality of tabs may comprise a thermally conductive material and may be configured to conduct heat away from the trailing edge. The plurality of tabs may be spaced radially along the trailing edge. The trailing edge may comprise a knife edge. The condensation section may be disposed radially outward from the airfoil body and in a path of a cooling airflow. The second cooling apparatus may comprise a cooling chamber defining a cooling path within the airfoil body. The cooling path may be configured to receive the cooling airflow.

An gas turbine engine is also provided. The gas turbine engine may comprise a turbine section having a core flowpath and a cooling airflow. An airfoil may have an airfoil body disposed in the core flowpath. The airfoil body may have a leading edge and a trailing edge. A heat pipe may be disposed within the airfoil. The heat pipe may include a vaporization section and a condensation section. The vaporization section may be disposed within the airfoil body. The condensation section may be disposed in the cooling airflow. A second cooling apparatus disposed within the airfoil body and configured to receive the cooling airflow.

In various embodiments, heat pipe is configured to remove heat from the trailing edge and the second cooling apparatus is configured to remove heat from the leading edge. The vaporization section may comprise a plurality of tabs extending toward the trailing edge. The plurality of tabs may be in contact with an inner surface of the airfoil body. The plurality of tabs may comprise a thermally conductive material and may be configured to conduct heat away from the trailing edge. The plurality of tabs may be spaced radially along the trailing edge. The trailing edge may comprise a knife edge. The second cooling apparatus may comprise a cooling chamber within the airfoil body. The cooling chamber may be configured to receive the cooling airflow. The cooling airflow may be bled from the compressor section and directed to the condensation section. The airfoil may comprise a vane.

A method of cooling an airfoil is also provided. The method may comprise the steps of disposing a vaporization section of a heat pipe within an airfoil body of the airfoil at a trailing edge, disposing a condensation section of the heat pipe radially outward from the airfoil, and defining a second cooling feature within the airfoil, In various embodiments, the vaporization section may include a plurality of tabs extending toward the trailing edge. The heat pipe may be configured to remove heat from the trailing edge of the airfoil.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 3A, 3B, 3C and 3D illustrate views of vane airfoil including a hybrid cooling assembly, in accordance with various embodiments;

DETAILED DESCRIPTION

Figure 1:
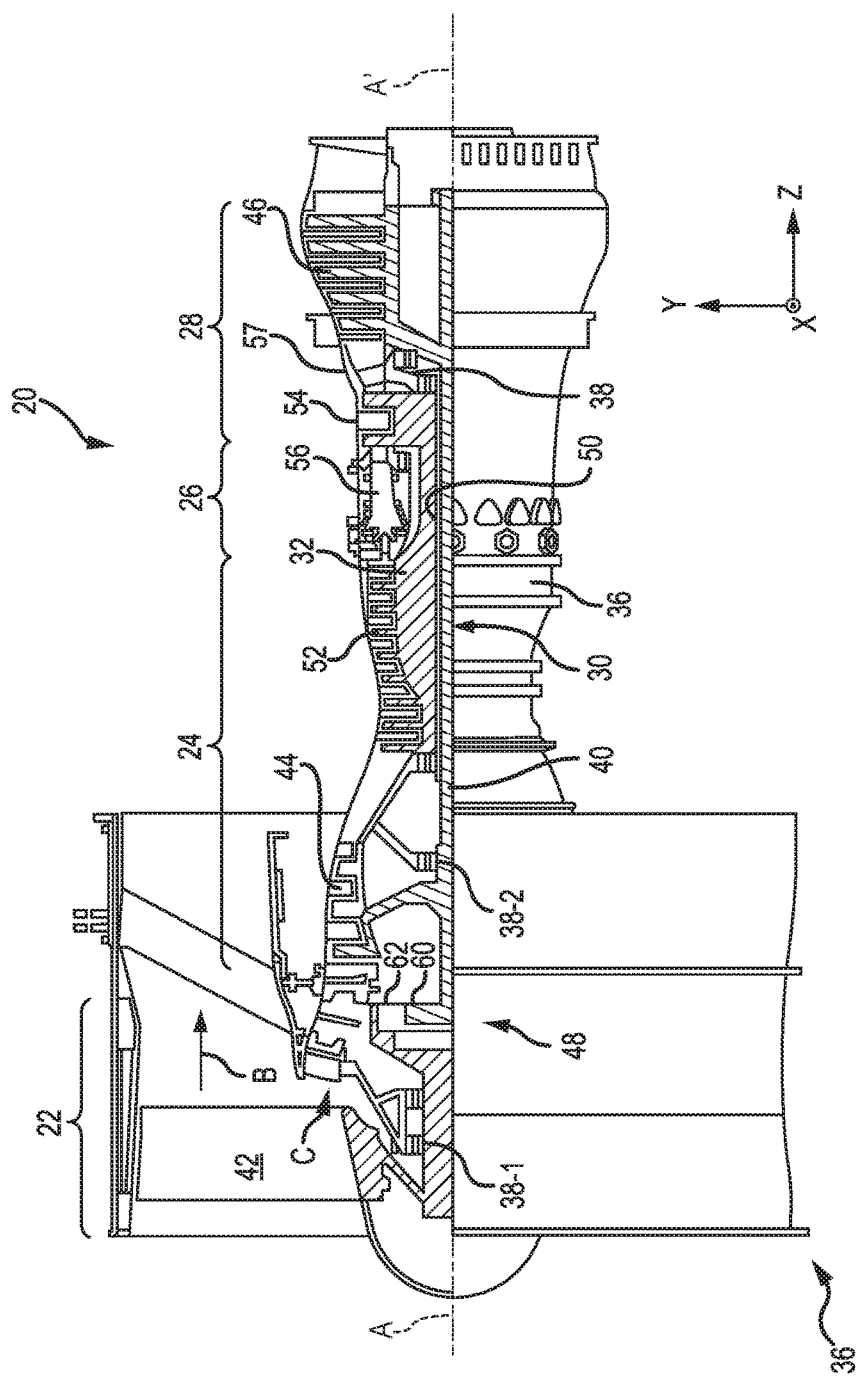
FIG. 1 illustrates a cross-sectional view of an exemplary gas turbine engine, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. A first component that is "radially outward" of a second component means that the first component is positioned at a greater distance away from the engine central longitudinal axis than the second component. As used herein, "distal" refers to the direction outward, or generally, away from a reference component. As used herein, "proximal" refers to a direction inward, or generally, towards the reference component.

An airfoil having a leading edge and a trailing edge may include cooling features. The cooling features may equalize the temperature throughout the airfoil. Various cooling features are formed at a leading edge and trailing edge of the airfoil, depending on the design and function of the airfoil. A desirable geometry of an airfoil, particularly at the trailing edge, may be a knife edge. A knife edge at the trailing edge may reduce air turbulence at the trailing edge, thereby increasing efficiency of the airfoil. The present disclosure describes a hybrid airfoil configured to provide a thinner trailing edge of an airfoil. A leading edge may include film and convective cooling, while the trailing edge includes a heat pipe cooling system disposed, in part, within the body of the airfoil. The heat pipe cooling system may include a plurality of tabs of conductive material, which extend from the heat pipe evaporator towards the trailing edge of the vane or blade. The tabs of conductive material may taper within the airfoil, such that the trailing edge may be made thinner, and may taper into what is referred to as a "knife edge." A knife edge at the trailing edge increases the efficiency of the airfoil.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
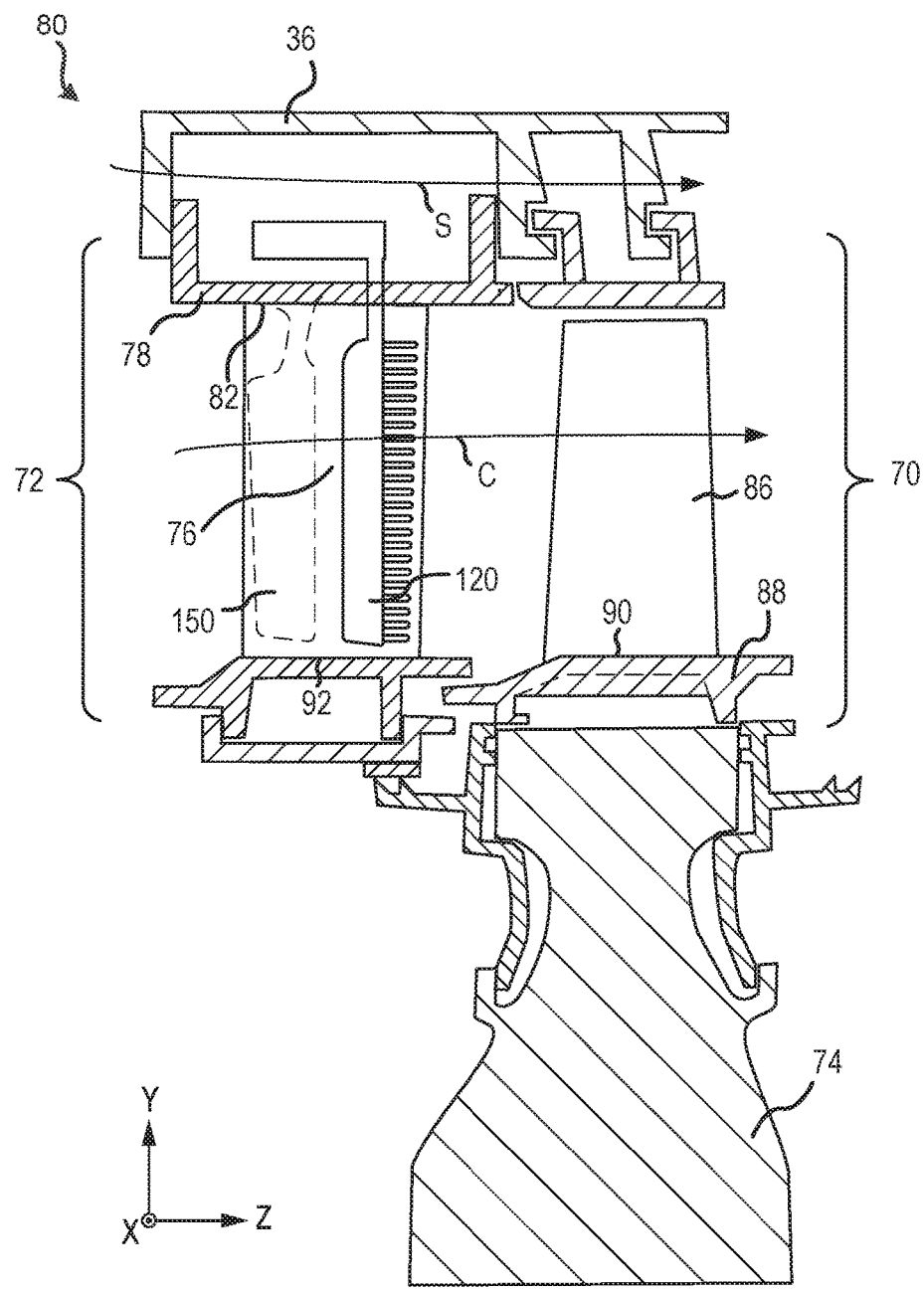
FIG. 2 illustrates an engine section including example airfoils, such as a blade and a vane of an exemplary gas turbine engine, according to various embodiments.

Referring now to FIG. 1 and to FIG. 2, according to various embodiments, each of low pressure compressor 44, high pressure compressor 52, low pressure turbine 46, and high pressure turbine 54 in gas turbine engine 20 may comprise one or more stages or sets of rotating blades and one or more stages or sets of stationary vanes axially interspersed with the associated blade stages but non-rotating about engine central longitudinal axis A-A'. Each compressor stage and turbine stage may comprise multiple interspersed stages of blades 70 and vanes 72. The blades 70 rotate about engine central longitudinal axis A-A', while the vanes 72 remain stationary about engine central longitudinal axis A-A'. For example, FIG. 2 schematically shows, by example, a portion of an engine section 80, which is illustrated as a turbine section 28 of gas turbine engine 20.

With reference to FIG. 2, a schematic view of a portion of engine section 80 is shown, in accordance with various embodiments. Engine section 80 may include a circumferential array of blades 70 coupled about a circumference of a generally circular disk 74. Disk 74 may be disposed radially inward of core airflow C and centered on the rotation axis of the gas turbine engine. Disk 74 with blades 70 may be configured to rotate about engine central longitudinal axis A-A'. Each blade 70 may include an airfoil body 86 with a platform 88 disposed at a radially inner edge 90 of the blade 70. Platform 88 may be an inner diameter platform and may couple blade 70 to disk 74. Upstream (forward) and downstream (aft) of blade 70 are circumferential arrays of vanes 72 configured to guide core airflow C flow through the engine section 80.

Each vane 72 may include an airfoil body 76 with a platform 78 disposed at a radially outer edge 82 of vane 72. Platform 78 may be an outer diameter platform and may be coupled to engine case structure 36. Platform 78 may be coupled to or integral with vane 72. Secondary airflow path S may be defined between platform 78 and engine case structure 36. Secondary airflow S may be utilized for multiple purposes including, for example, cooling and pressurization. In various embodiments, vane 72 may comprise a first cooling apparatus 120 and a second cooling apparatus 150 configured to remove heat from the airfoil body 76 of vane 72. Blade 70 may similarly include a first cooling apparatus and a second cooling apparatus, such as first cooling apparatus 120 and second cooling apparatus 150.

Figure 3A:
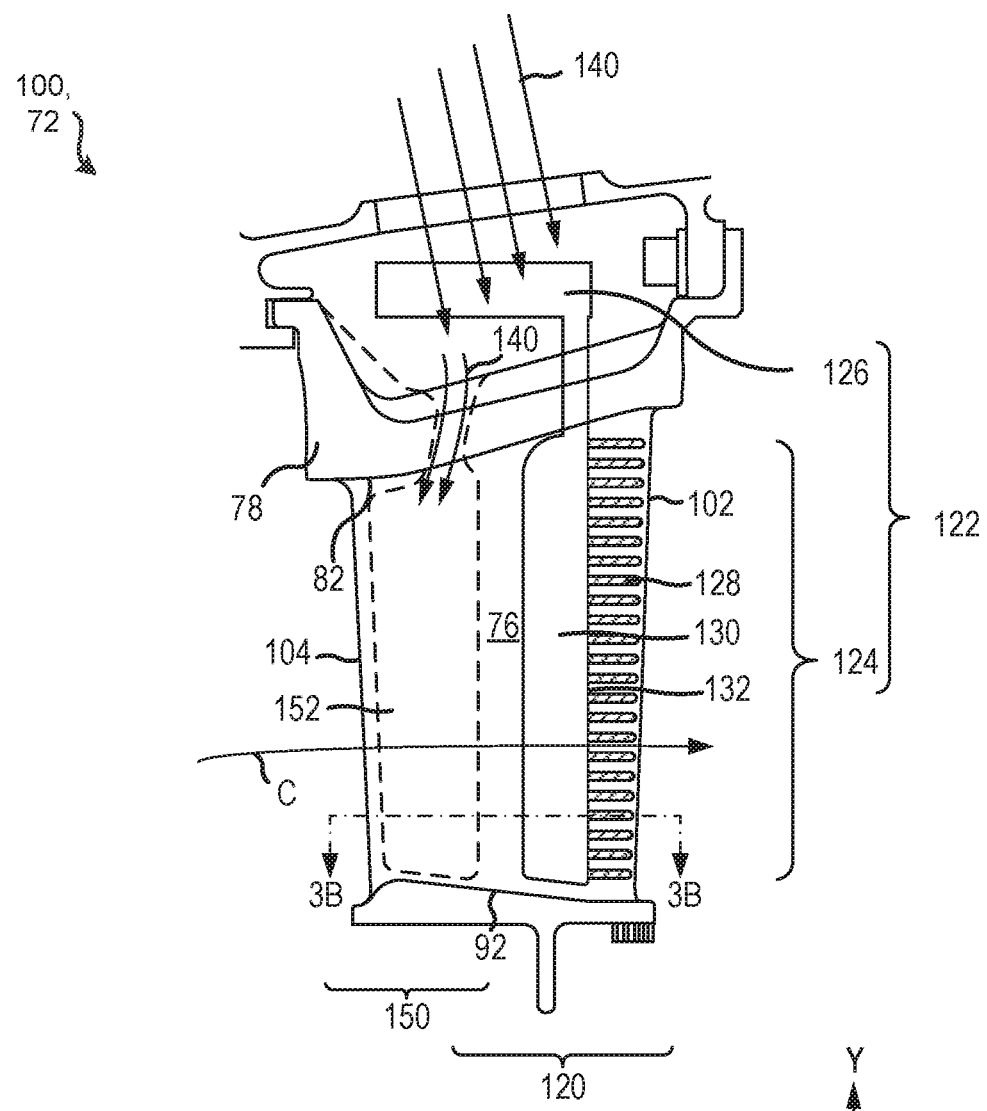

With reference to FIG. 3A, a schematic view an airfoil 100 having a first cooling apparatus 120 and second cooling apparatus 150, is shown according to various embodiments. The airfoil 100 having first cooling apparatus 120 and second cooling apparatus 150 may be a blade or a vane. Airfoil 100 is depicted in FIG. 3A as a vane 72, however, the features may be applicable to blades 70 (see FIG. 5). Airfoil 100 may be a vane 72 comprising a trailing edge 102 facing an aft direction in a gas turbine engine (positive z direction) and leading edge 104 facing a forward direction in the gas turbine engine (negative z direction). Leading edge 104 and trailing edge 102 may be configured and oriented to direct airflow through engine section 80 (FIG. 2). Airfoil body 76 of vane 72 may extend from a radially inner edge 92 to radially outer edge 82 of vane 72.

In various embodiments, vane 72 may comprise a first cooling apparatus 120 configured to remove heat from airfoil body 76, particularly at trailing edge 102. First cooling apparatus 120 may include a heat pipe 122, which may be at least partially disposed within or integrally formed within airfoil body 76. Although one type of heat pipe is illustrated in FIG. 3A, various types of heat pipes may be used with first cooling apparatus 120, such as an oscillating or pulsating heat pipe, a capillary heat pipe, or other suitable heat transport system.

In various embodiments, heat pipe 122 may comprise a vaporization section 124 and a condensation section 126. Vaporization section 124 may be formed within airfoil body 76 as a chamber, which may form a heat pipe tube 132, or heat pipe tube 132 may be installed within airfoil body 76. Heat pipe tube 132 comprises a sealed tube containing a working medium 130, which is a fluid contained within heat pipe tube 132 that can pass between the vaporization section 124 and condensation section 126. Heat pipe 122 uses an evaporative cooling cycle to transfer thermal energy through the evaporation and condensation of working medium 130.

In various embodiments, heat pipe 122 may further comprise one or more fins or tabs 128 extending from heat pipe tube 132 in vaporization section 124. Tabs 128 may be a substantially solid material, such as a thermally conductive material, disposed within airfoil body 72 and in thermal communication with heat pipe tube 132 and/or working medium 130. The thermally conductive material of tabs 128 may be a metal. For example, tabs 128 may include copper, aluminum, nickel, cobalt, molybdenum, titanium, aluminum, steel, stainless steel or other thermally conductive material. In various embodiments, each tab 128 may define a chamber, which may contain working medium 130, with each tab chamber being in fluid communication with heat pipe tube 132. In that regard, tabs 128 may be an extension of heat pipe tube 132, and working medium 130 may flow between tabs 128 and heat pipe tube 132. Thus, tabs 128 may be coupled to or integral with a heat pipe tube 132 of vaporization section 124.

Vaporization section 124 of heat pipe 122 is disposed within the airfoil body 76 of vane 72, which is disposed in the core flowpath C. Tabs 128 are in thermal communication with the airfoil body 76 and with the working medium 130 within heat pipe 122. The working medium 130 in the in vaporization section 124 of heat pipe 122 absorbs thermal energy present in vaporization section 124 and transfers that absorbed thermal energy to condensation section 126. In a liquid state, working medium 130 is distributed to the vaporization section 124. Thermal energy absorbed by vane 72 from the hot gases in the core flowpath C heats vaporization section 124 of heat pipe 122. Thermal energy may be conducted from the airfoil body 76 by tabs 128 to working medium 130 within heat pipe tube 132 and/or by the working medium 130 within tabs 128, particularly at trailing edge 102. The transfer of thermal energy from the airfoil body 76 to working medium 130 increases the temperature of the working medium 130 in vaporization section 124. The heating of vaporization section 124 causes the working medium 130 in vaporization section 124 to evaporate within heat pipe tube 132. Working medium 130 absorbs thermal energy and is converted to a gaseous state when its boiling point is reached. The working medium 130 in the gaseous state then passes to condensation section 126.

Condensation section 126 may be disposed in area away from airfoil body 76 and core flowpath C, i.e., condensation section 126 may be disposed in an area that is cooler than core flowpath C. Condensation section 126 may be disposed radially outward from airfoil body 76, and may be disposed within platform 78 or radially outward from platform 78. Condensation section 126 may be in fluid communication with an airflow source, such as an upstream compressor in the compressor section 24 (FIG. 1) or other source, which provides cooling airflow 140, such as bleed compressor air. In various embodiments, a cooling airflow 140 may be directed from secondary flowpath S to condensation section 126. Condensation section 126 may be disposed in a path of cooling airflow 140.

Cooling airflow 140 flows around condensation section 126 and absorbs thermal energy from condensation section 126, removing thermal energy from working medium 130, and causing the vaporized working medium 130 to condense back to a liquid state. The working medium 130 in the liquid state then passes to vaporization section 124. Thus, working medium 130 physically moves between vaporization section 124 and condensation section 126, in order to transfer thermal energy between the locations where evaporation and condensation occur, thereby removing heat from airfoil body 76. Tabs 128 increase the heat transfer away from airfoil body 76, particularly at trailing edge 102. The composition of working medium 130 used in heat pipe 122 is selected according to the particular operating conditions at which heat transfer is desired.

In various embodiments, vane 72 may further comprise a second cooling apparatus 150 configured to remove heat from airfoil body 76, particularly at leading edge 104. Second cooling apparatus 150 may be configured to receive and use cooling airflow 140 to cool leading edge 104 of vane 72. Cooling airflow 140 may flow around condensation section 126 and into second cooling apparatus 150. Second cooling apparatus 150 may be a conductive and/or convective cooling system. In various embodiments, second cooling apparatus 150 may comprise one or more cooling chambers 152 disposed within airfoil body 76. Cooling chambers 152 may operate as impingement cavities for airfoil body 76. A cooling chamber 152 may define a cooling path within airfoil body 76 and may direct the cooling airflow 140 through airfoil body 76 in proximity to leading edge 104. Cooling airflow 140 may flow through cooling chambers 152 and conduct heat away from airfoil body 76. Various features, such as pedestals, baffles, ribs, trip strips, may be disposed within cooling chambers 152 to interact with the flowing air and provide surface area for the cooling airflow to contact. Cooling chambers 152 may further be configured to direct the cooling airflow 140 from within cooling chambers 152 to film holes, which may direct cooling airflow 140 out of airfoil body 76 and into core flowpath C.

Figure 3B:
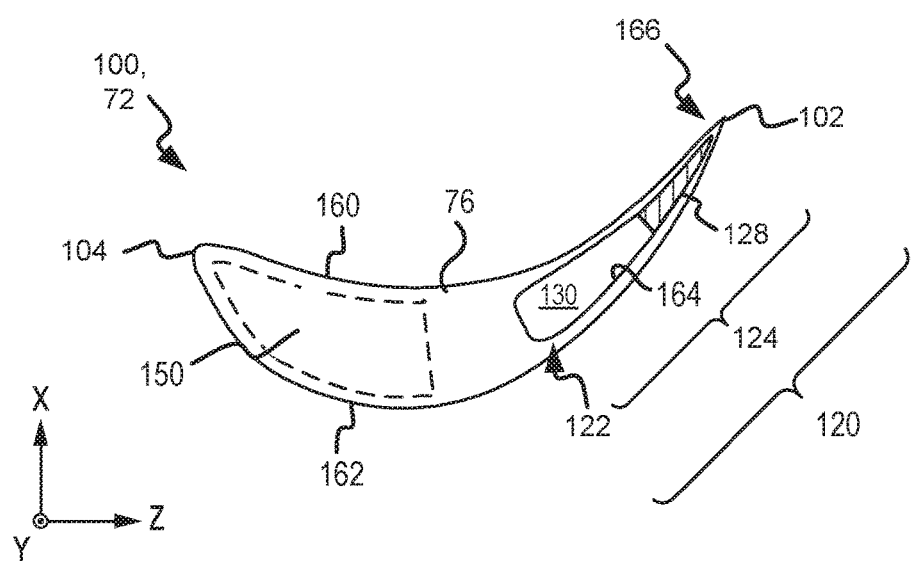

FIG. 3B illustrates a cross-sectional view of an airfoil 100 taken along line 3B-3B of FIG. 3A, in accordance with various embodiments. Airfoil body 76 may include a generally concave pressure side 160 and a generally convex suction side 162 joined together at the respective trailing edge 102 and leading edge 104. An inner surface 164 of airfoil body 76 may be configured to accommodate first cooling apparatus 120 and second cooling apparatus 150. Vaporization section 124, including heat pipe 122 with tabs 128, may be in contact, i.e. physical contact and/or thermal contact, with the inner surface 164 of airfoil body 76. Working fluid 130 may be in contact with the inner surface 164 of airfoil body 76. Heat may be conducted away from the airfoil body 76 by heat pipe 122, and more specifically, heat may be conducted away from trailing edge 102 by tabs 128.

In various embodiments, tab 128 may have a shape that follows a contour of an inner surface 164 of airfoil body 76. Tab 128 may have a tapered shape, similar to the shape of airfoil body 76, as it approaches trailing edge 102. Trailing edge 102 may taper into a knife edge 166. Tabs 128 conduct heat away from trailing edge and to working medium 130 within heat pipe 122. Thus, airfoil 100 may have a knife edge 166 at trailing edge 102 that is cooled by heat pipe 122.

With reference to FIGS. 3C and 3D and still to FIG. 3B, a portion of vaporization section 124 of a heat pipe 122, and a tab 128 from a vaporization section 124 of a heat pipe 122, are shown according to various embodiments. A plurality of tabs 128 may be radially spaced along a trailing edge 102 of airfoil 100 (FIG. 3A). Tabs 128 may be configured with a tapered, sloped or angled geometry. Tab 128 may taper in the x-direction (referred to as a thickness) and/or the y-direction (referred to as a width). Tab 128 may have a thickness defined by a first surface 170 and a second surface 172 opposite to first surface 170.

Tab 128 has a first thickness T1 proximal to heat pipe 122 and may have a second thickness T2, which is distal to first thickness T1 relative to heat pipe 122. In various embodiments, second thickness T2 may be less than first thickness T1. In various embodiments, tab 128 may have a uniform thickness, such that second thickness T2 is substantially the same as first thickness T1. Second thickness T2 may be at an axial end 174 of tab 128 which may correspond to the trailing edge 102 of an airfoil 100 (see FIG. 3B) when heat pipe 122 is installed within airfoil body 76. Tab 128 may have various geometries in the xy plane. For example, tab 128 may have a rounded shape, elongated trapezoidal shape, fan shape, rectangular shape, irregular shape, or other shape. Tab 128 have a first width W1 proximal to heat pipe 122 and may have a second width W2, which is distal to first width W1 relative to heat pipe 122. Second thickness W2 may be at an axial end 174 of tab 128 and may be less than, greater than, or equal to first width W1. The configuration of tabs 128 may be determined according to the configuration of the airfoil 100.

Figure 4A:
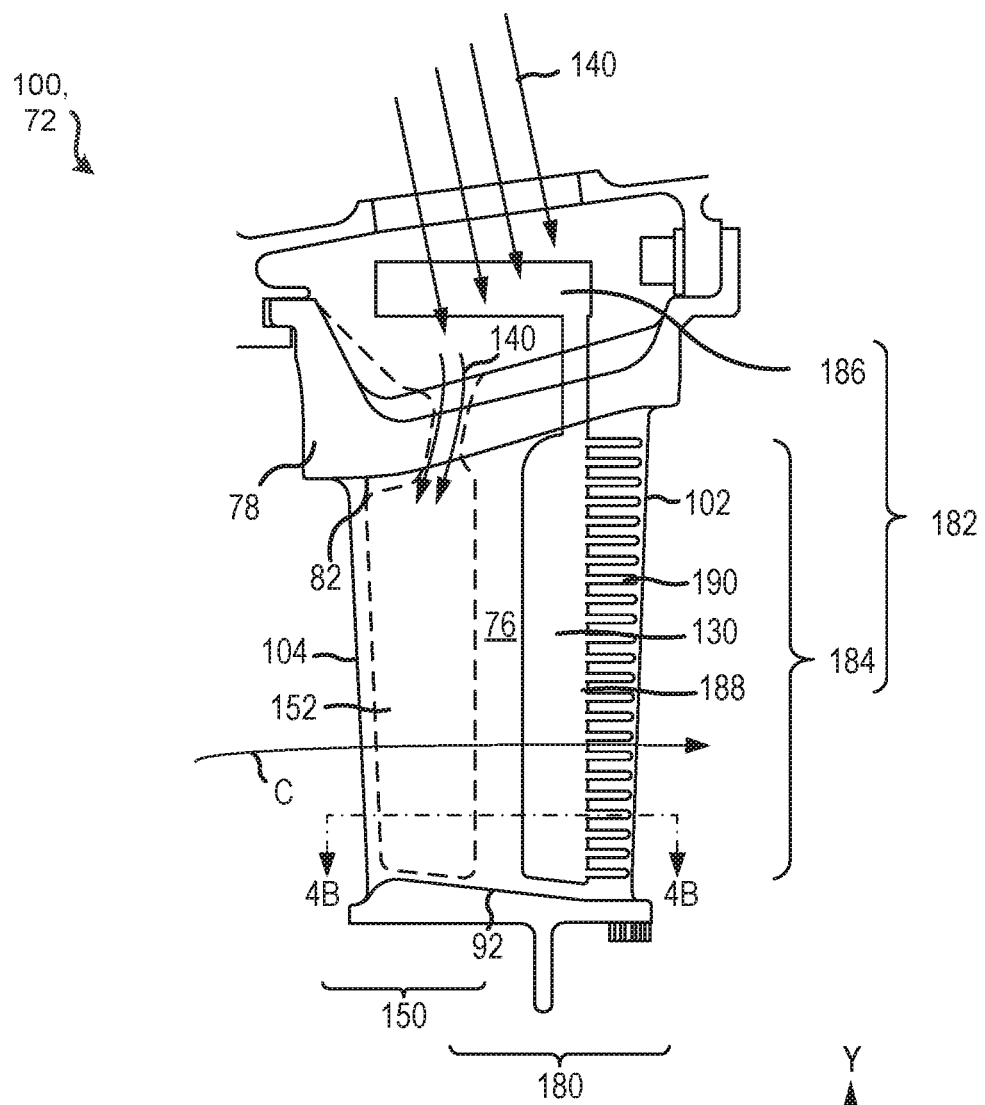
FIGS. 4A and 4B illustrate views of vane airfoil including a hybrid cooling assembly, in accordance with various embodiments.
Figure 4B:
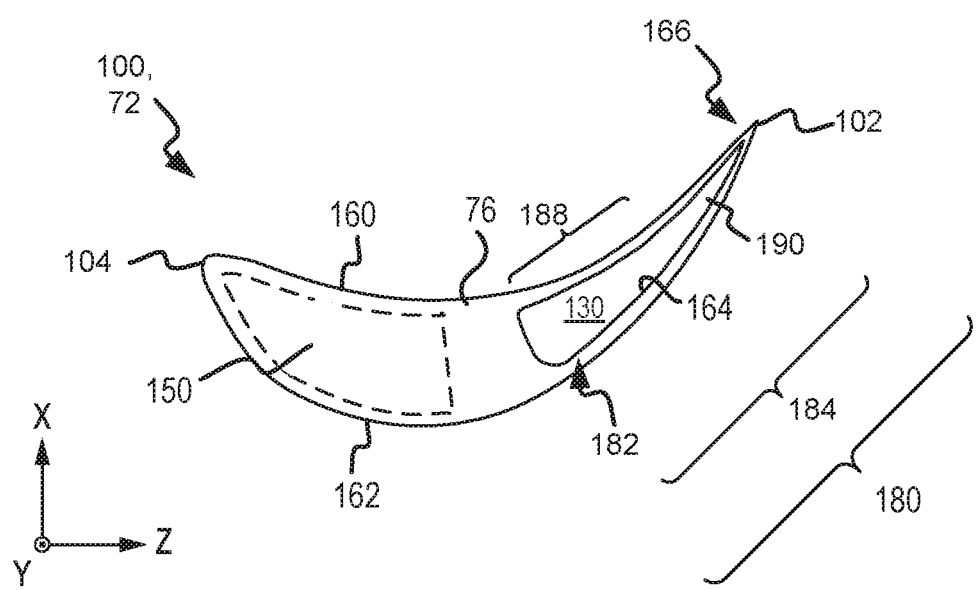

With reference to FIGS. 4A and 4B, a schematic view an airfoil 100 having a first cooling apparatus 180 and second cooling apparatus 150, is shown according to various embodiments. Similar to first cooling apparatus 120 from FIG. 3A, first cooling apparatus 180 may include a heat pipe 182 comprising vaporization section 184 and a condensation section 186. Vaporization section 184 may be formed within airfoil body 76 as a chamber, which may include a heat pipe tube 188 and chamber portions 190 defined by airfoil body 76. Chamber portions 190 may be integral with or in fluid communication with heat pipe tube 188. Chamber portions 190 may extend from heat pipe tube 188 toward trailing edge 102 of airfoil body 76. Heat pipe tube 188 and chamber portions 190 comprise a sealed tube containing the working medium 130, and working medium 130 may flow between heat pipe tube 188 and chamber portions 190. The working medium 130 present in heat pipe tube 188 and chamber portions 190 of vaporization section 184 absorbs thermal energy from airfoil body 76. The working medium 130 evaporates and passes to condensation section 186.

FIG. 4B illustrates a cross-sectional view of an airfoil 100 taken along line 4B-4B of FIG. 4A, in accordance with various embodiments. Working medium 130 may be in contact, i.e. physical contact and/or thermal contact, with the inner surface 164 of airfoil body 76. Working fluid 130 may be in contact with the inner surface 164 of airfoil body 76 and may transfer heat from airfoil body 76 to condensation section 186. In various embodiments, chamber portions 190 defined by inner surface 164 may have a shape that follows a contour of airfoil body 76. Chamber portions 190 may have a tapered shape approaching trailing edge 102, similar to the shape of airfoil body 76. Heat may be conducted away from the airfoil body 76 by heat pipe 182, and more specifically, heat may be conducted away from trailing edge 102 by the working fluid 130 within chamber portions 190.

Figure 5:
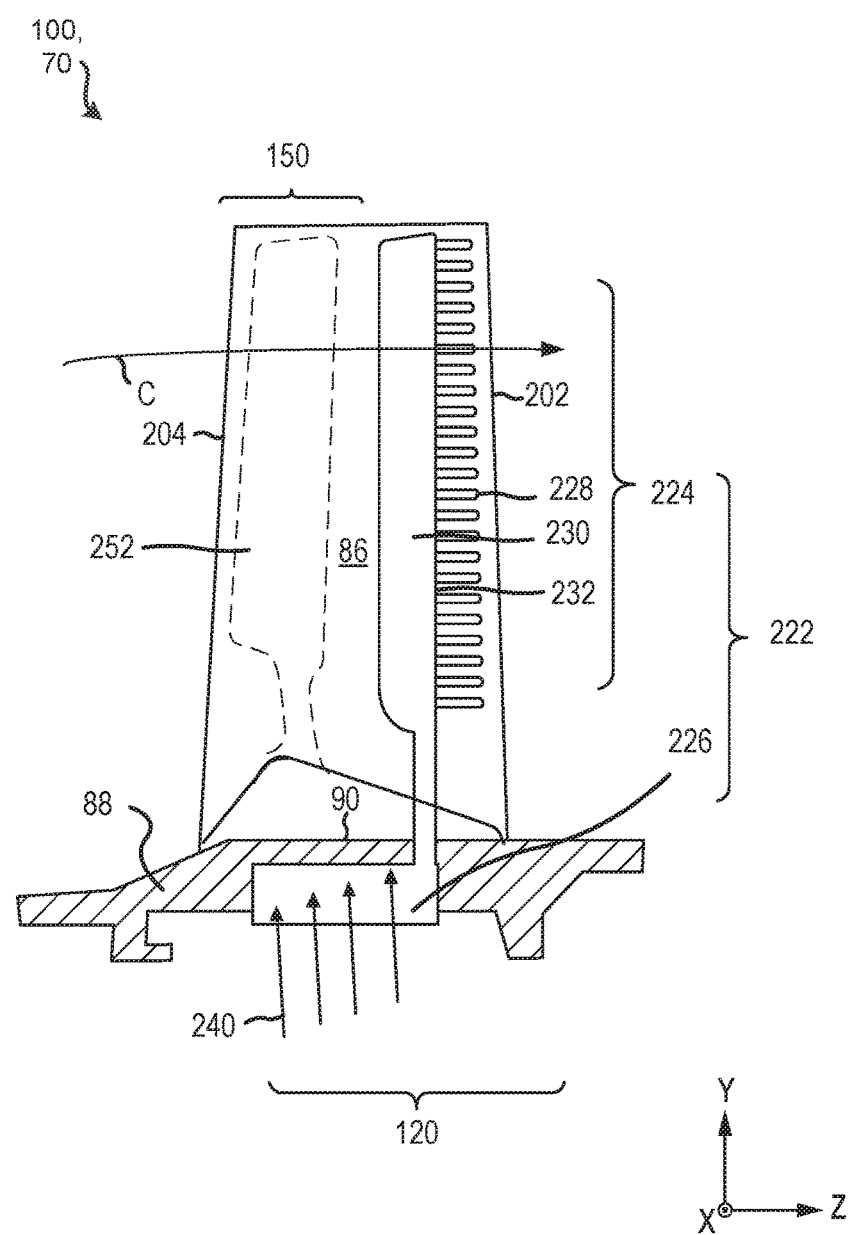
FIG. 5 illustrates a schematic view of blade airfoil including a hybrid cooling assembly in accordance with various embodiments.

With reference to FIG. 5, a schematic view an airfoil 100 having a first cooling apparatus 120 and second cooling apparatus 150, is shown according to various embodiments. The airfoil 100 may be a blade comprising a trailing edge 202 facing an aft direction in a gas turbine engine and leading edge 204 facing a forward direction in the gas turbine engine. Leading edge 204 and trailing edge 202 may be configured and oriented to direct airflow through engine section 80 (FIG. 2).

In various embodiments, blade 70 may comprise a first cooling apparatus 120 configured to remove heat from airfoil body 86, particularly at trailing edge 202. First cooling apparatus 120 may include a heat pipe 222. Heat pipe 222 in FIG. 5 may be similar to heat pipe 122 in FIG. 3A. Heat pipe 222 may comprise a vaporization section 224 and a condensation section 226. Vaporization section 224 may further comprise one or more tabs 228 extending from heat pipe 222. Tabs 128 may be made of a thermally conductive material, such as a metal, in thermal communication with the airfoil body 86 and with the working medium 230 within heat pipe 222. Heat pipe 222 comprises a sealed tube, such as heat pipe tube 232, containing a working medium 230.

Vaporization section 224 is disposed within the airfoil body 86 of blade 70, which is disposed in the core flowpath C. Thermal energy absorbed by blade 70 from the hot gases in the core flowpath C heats vaporization section 224 of heat pipe 222. Tabs 228 conduct thermal energy from the airfoil body 86, particularly at trailing edge 202, to working medium 230. The heating of vaporization section 224 causes the working medium 230 in vaporization section 224 to evaporate within heat pipe tube 232 and move to condensation section 226.

Condensation section 226 may be disposed in area away from airfoil body 86 and core flowpath C. Condensation section 226 may be disposed radially inward from airfoil body 86, and may be disposed within platform 88 or radially inward from platform 88. Cooling airflow 240 flows around condensation section 226 and absorbs thermal energy from condensation section 226 and removes thermal energy from working medium 230.

Figure 6:
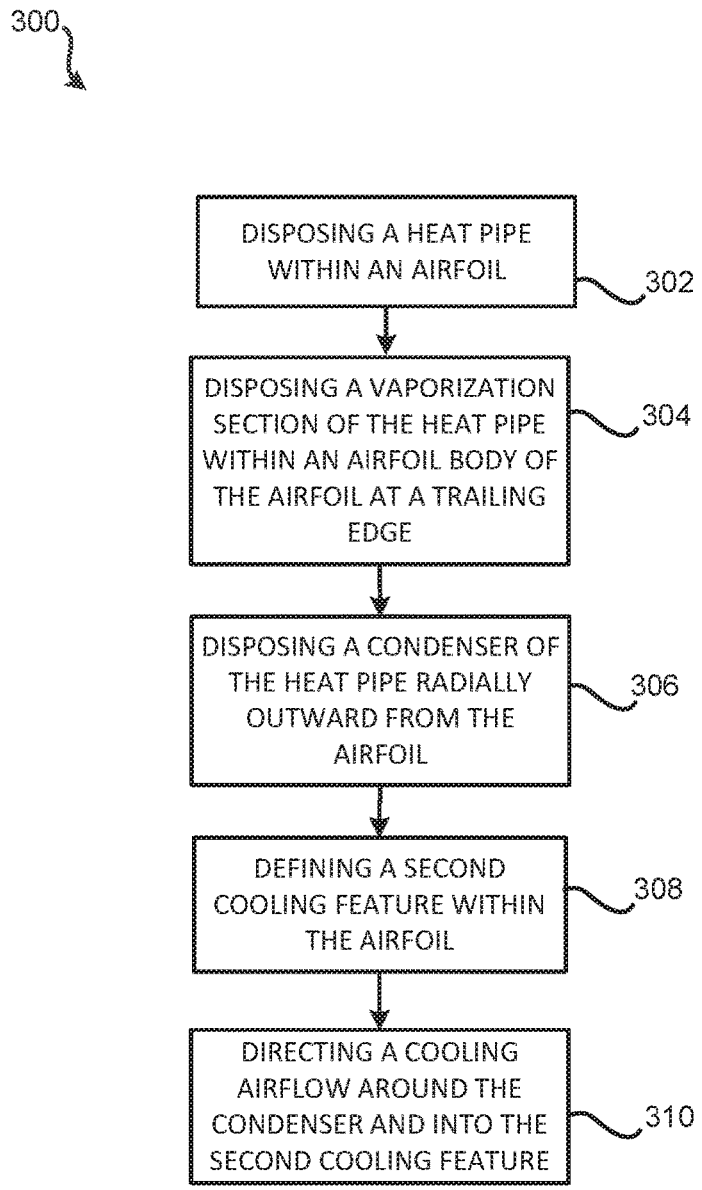
FIG. 6 illustrates a method of cooling an airfoil, in accordance with various embodiments.

With reference to FIG. 6, a method 300 a method of cooling an airfoil is shown, in accordance with various embodiments. Method 300 may include the steps of disposing a heat pipe within an airfoil (step 302) by disposing a vaporization section of the heat pipe within an airfoil body of the airfoil at a trailing edge (step 304), and disposing a condensation section of the heat pipe radially outward from the airfoil (step 306). Method 300 may include the step s of defining a second cooling feature within the airfoil (step 308), and directing a cooling airflow around the condensation section and into the second cooling feature (step 310). The vaporization section may include a plurality of tabs extending toward the trailing edge. The second cooling feature configured to cool a leading edge of the airfoil. Step 310 may further include precooling the cooling airflow prior to directing the cooling airflow around the condensation section.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. An airfoil, comprising:
an airfoil body having a leading edge and a trailing edge;
a heat pipe disposed within the airfoil, the heat pipe including a vaporization section and a condensation section, the vaporization section disposed within the airfoil body and configured to remove heat from the trailing edge; and a second cooling apparatus disposed within the airfoil body and configured to remove heat from the leading edge, wherein the condensation section is disposed radially outward from the airfoil body and in a path of a cooling airflow, and wherein the second cooling apparatus comprises a cooling chamber defining a cooling path within the airfoil body, the cooling path configured to receive the cooling airflow.

2. The airfoil of claim 1, wherein the vaporization section comprises a plurality of tabs extending toward the trailing edge.

3. The airfoil of claim 2, wherein the plurality of tabs are in contact with an inner surface of the airfoil body.

4. The airfoil of claim 3, wherein the plurality of tabs comprise a thermally conductive material and are configured to conduct heat away from the trailing edge.

5. The airfoil of claim 4, wherein the plurality of tabs are spaced radially along the trailing edge.

6. The airfoil of claim 5, wherein the trailing edge comprises a knife edge.

7. A gas turbine engine, comprising:
a turbine section having a core flowpath and a cooling airflow;
an airfoil having an airfoil body disposed in the core flowpath, the airfoil body having a leading edge and a trailing edge;
a heat pipe disposed within the airfoil, the heat pipe including a vaporization section and a condensation section, the vaporization section disposed within the airfoil body and the condensation section disposed in the cooling airflow; and
a second cooling apparatus disposed within the airfoil body and configured to receive the cooling airflow,
wherein the condensation section is disposed radially outward from the airfoil body and in a path of the cooling airflow, and wherein the second cooling apparatus comprises a cooling chamber defining a cooling path within the airfoil body, the cooling path configured to receive the cooling airflow.

8. The gas turbine engine of claim 7, wherein the heat pipe is configured to remove heat from the trailing edge and the second cooling apparatus is configured to remove heat from the leading edge.

9. The gas turbine engine of claim 7, wherein the vaporization section comprises a plurality of tabs extending toward the trailing edge.

10. The gas turbine engine of claim 9, wherein the plurality of tabs are in contact with an inner surface of the airfoil body.

11. The gas turbine engine of claim 9, wherein the plurality of tabs comprise a thermally conductive material and are configured to conduct heat away from the trailing edge.

12. The gas turbine engine of claim 10, wherein the trailing edge comprises a knife edge.

13. The gas turbine engine of claim 7, further comprising a compressor section, wherein the cooling airflow is bled from the compressor section and directed to the condensation section of the heat pipe.

14. A method of cooling an airfoil, comprising,
disposing a vaporization section of a heat pipe within an airfoil body of the airfoil at a trailing edge;
disposing a condensation section of the heat pipe radially outward from the airfoil;
defining a second cooling feature within the airfoil, the second cooling feature configured to remove heat from a leading edge of the airfoil; and
directing a cooling airflow around the condensation section and into the second cooling feature.

15. The method of claim 14, wherein the vaporization section includes a plurality of tabs extending toward the trailing edge.

16. The method of claim 15, wherein the heat pipe is configured to remove heat from the trailing edge of the airfoil.

* * * * *